No. 830,799. PATENTED SEPT. 11, 1906.
G. W. MORETON.
DRIVING MECHANISM.
APPLICATION FILED FEB. 10, 1906.
2 SHEETS—SHEET 1.
FIG_1_
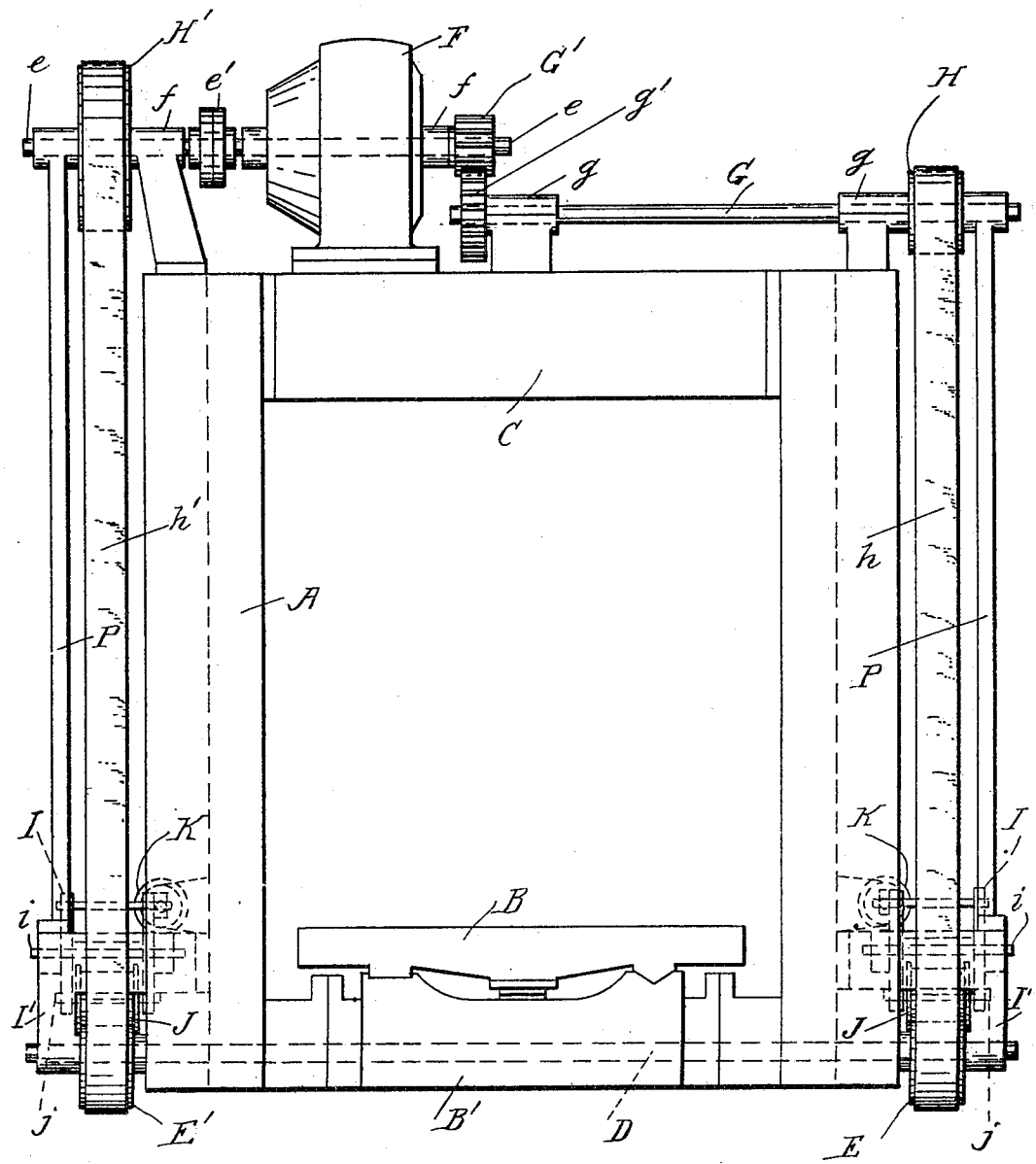
WITNESSES:
Arthur J. Fuchs
S. E. Tomlinson
INVENTOR
George W. Moreton.
BY Herbert W. Jenner.
Attorney

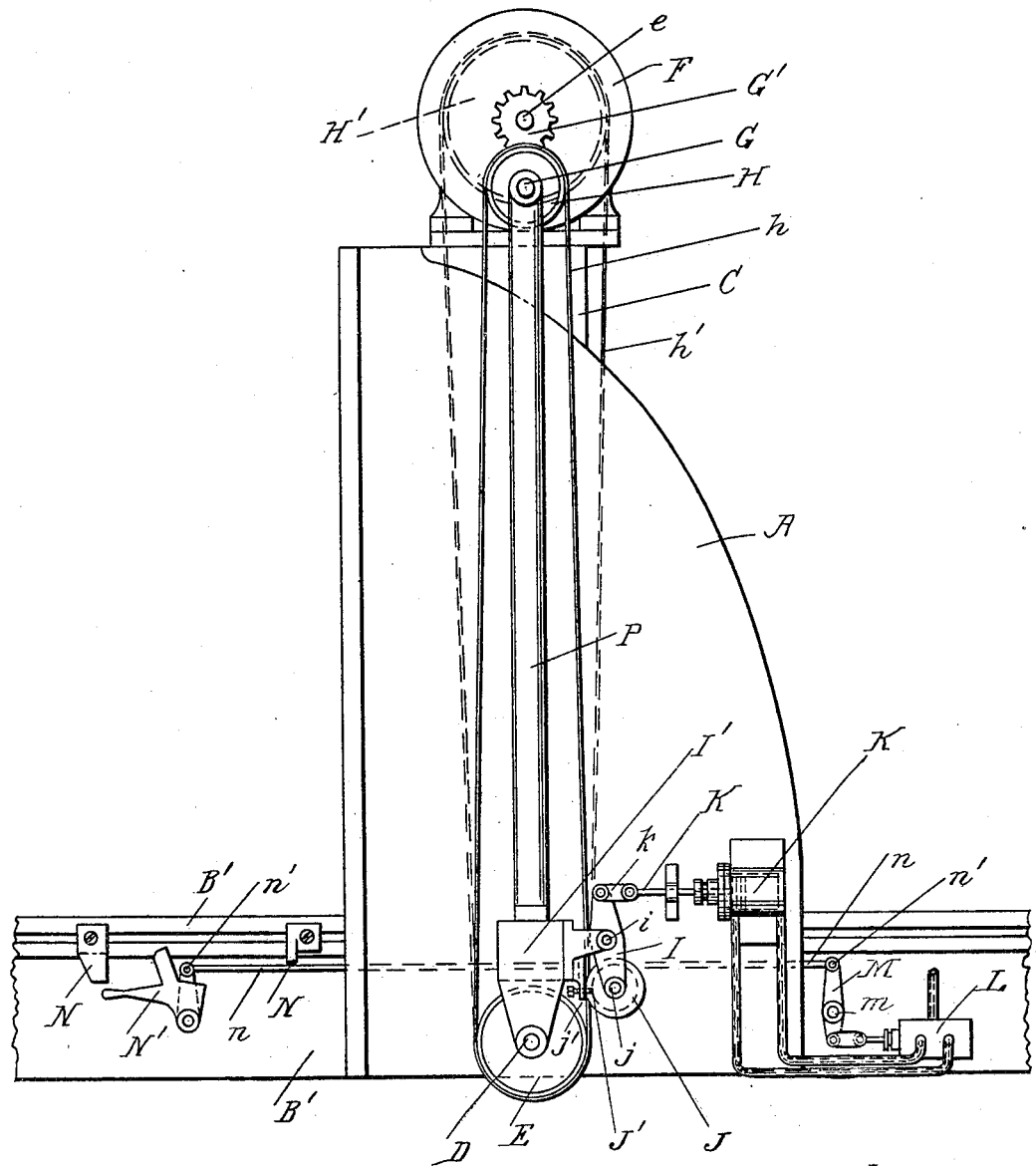

UNITED STATES PATENT OFFICE.

GEORGE WILLIAM MORETON, OF WILMINGTON, DELAWARE, ASSIGNOR TO BETTS MACHINE COMPANY, OF WILMINGTON, DELAWARE.

DRIVING MECHANISM.

No. 830,799.   Specification of Letters Patent.   Patented Sept. 11, 1906.

Application filed February 10, 1906. Serial No. 300,537.

*To all whom it may concern:*

Be it known that I, GEORGE WILLIAM MORETON, a citizen of the United States, residing at Wilmington, in the county of Newcastle and State of Delaware, have invented certain new and useful Improvements in Driving Mechanism; and I do hereby declare the following to be a full, clear, and exact description of the invention, such as will enable others skilled in the art to which it appertains to make and use the same.

This invention relates to mechanism for driving planing-machines and other similar reciprocating tools; and it consists in the novel construction and combination of the parts hereinafter fully described and claimed, whereby the machine is driven forward at one speed and in the reverse direction at an increased speed.

In the drawings, Figure 1 is a front view of parts of a reciprocating planing-machine provided with driving mechanism according to this invention. Fig. 2 is a side view of portions of the machine and the driving mechanism.

A is the frame of the reciprocating planing-machine.

B is the table for carrying the work, which is slidable longitudinally on the bed B'.

C is the girth or cross-piece at the top part of the frame.

D is the machine-shaft which is journaled in the bed under the table and the end portions of which project at each side of the machine.

E is a belt-pulley secured on one end portion of the shaft D for driving it in a forward direction, and E' is a similar belt-pulley secured on the other end portion of the shaft D for driving it in the reverse direction.

F is a motor of any approved construction which is secured to the cross-piece C and provided with a main driving-shaft $e$. This shaft $e$ is journaled in suitable bearings $f$ and is preferably formed in sections secured together by a coupling $e'$. The machine-shaft D can also be formed in sections secured together by any approved coupling in a similar manner.

The table B is driven by the machine-shaft by any approved driving devices, such as toothed wheels and pinions and a toothed rack arranged under the middle part of the table. These parts are not fully shown in the drawings, as they do not differ materially from those ordinarily used. It is immaterial whether the machine-shaft D is formed of a single piece or in sections, provided its sections are operatively connected and provided the machine is provided with two independent driving-pulleys arranged one on each side of its frame.

G is a single counter-shaft which is journaled in bearings $g$ at the upper part of the frame. A toothed pinion G' is secured on the shaft $e$ and gears into a toothed wheel $g'$ on the shaft G, so that the said shaft G is driven at a slower speed than the shaft $e$ and in the reverse direction.

H is a belt-pulley secured on the counter-shaft G, and $h$ is a belt which passes over the pulleys H and E and drives the machine in a forward direction.

H' is a belt-pulley, preferably larger in diameter than the pulley H and secured on the shaft $e$. A belt $h'$ passes around the pulleys H' and E' and drives the machine in the reverse direction.

In carrying out this invention any approved means for revolving the main driving-shaft $e$ can be used instead of the motor shown, and any approved wheels and flexible driving devices can be used for connecting the shafts instead of the pulleys and belts shown.

The machine is driven by pressing one or the other of its driving-belts into driving contact with their respective pulleys on the machine-shaft.

Similar pressing mechanisms are provided at each side of the machine, and the description will therefore be confined to the pressing mechanism on one side of the machine.

I is a presser-lever provided with a pin $i$, by which it is pivoted to a bracket I', secured to the side of the machine-frame.

J is a presser-pulley which is mounted on a shaft $j$, carried by the lower end portion of the lever I.

A stop J' is provided for limiting the forward motion of the lever I, and this stop preferably consists of an adjustable screw which engages with a lug $j'$ on the bracket I'.

K is an air-cylinder secured to the side of the machine and provided with a piston and a piston-rod K', which is connected with the upper end portion of the lever I by a link $k$ and suitable pivot-pins. The air-cylinder is provided with a valve L of any approved construction and pipes for distributing compressed air to the ends of the cylinder, and thereby operating the presser-lever.

M is the valve-lever which is secured on a shaft m and operatively connected with the valve L. The shaft m is journaled in the bed and passes through it, and a similar valve-lever is secured on its end portion at the other side of the machine. The respective valves and their connections are so arranged that when one presser-lever is moved in one direction the other presser-lever is moved in the reverse direction. In this manner it is impossible to press both belts on their pulleys simultaneously. The air-valves are operated automatically by tappet mechanism.

N represents tappets or dogs carried by the table B and adjustable in the usual manner.

N' is the tappet-lever, which is pivoted to the bed, and n is a rod which is pivotally connected to the tappet-lever N' and the valve-lever M by pins n'. The tappet mechanism may be of any approved construction used on machines of this class.

P represents standards which are secured to the brackets I' and which support the outer end portions of the main shaft and counter-shaft.

When the motor is in action, the main driving-shaft and the counter-shaft are revolved continuously, and the belts connected with them are driven in opposite directions. When the presser-pulley is operated to tighten the belt h upon the pulley E, the table of the machine is driven in a forward direction and the work secured to it is subjected to the action of the planing-tools. When the tappet mechanism reverses the air-valves, the pulley E is released from the belt h, and the belt h' is pressed into driving contact with its pulley E', so that the table is moved in the reverse direction and at an increased speed.

What I claim is—

1. The combination, with a machine of the character described provided with two longitudinally-arranged side frames, a cross-piece secured between the upper parts of the said side frames, and a reciprocatory work-table arranged between the said side frames; of a main shaft provided with means for revolving it, a counter-shaft, and toothed wheels connecting the adjacent end portions of the said shafts, said shafts being arranged above the said cross-piece and side frames with their opposite end portions projecting beyond the planes of the said side frames; driving-pulleys secured on the projecting end portions of the said shafts and revolving in opposite directions, two pulleys for driving the said work-table forward and backward respectively, said pulleys being arranged longitudinally of the said side frames and at their lower parts, belts connecting the said pulleys with the said driving-wheels respectively, and means for tightening and releasing the said belts alternately.

2. The combination, with two side frames, and a cross-piece extending between their upper parts; of a motor provided with a shaft and supported by the said cross-piece, a counter-shaft also supported by the said cross-piece, toothed wheels connecting the adjacent end portions of the said shafts and constraining them to revolve in opposite directions, the opposite end portions of the said shafts being arranged to project beyond the planes of the said side frames, pulleys arranged on the opposite end portions of the said shafts outside of the said side frames, two independent driving-pulleys journaled outside of the said side frames at the lower parts thereof, belts connecting the said pulleys with the said driving-pulleys respectively, and means for tightening and releasing the said belts alternately.

In testimony whereof I have affixed my signature in the presence of two witnesses.

GEORGE WILLIAM MORETON.

Witnesses:
F. D. L. MITCHELL,
JOHN W. PEREGOY.